(No Model.)
D. MAUS.
TRIMMER FOR SEWING MACHINES.
No. 296,423. Patented Apr. 8, 1884.
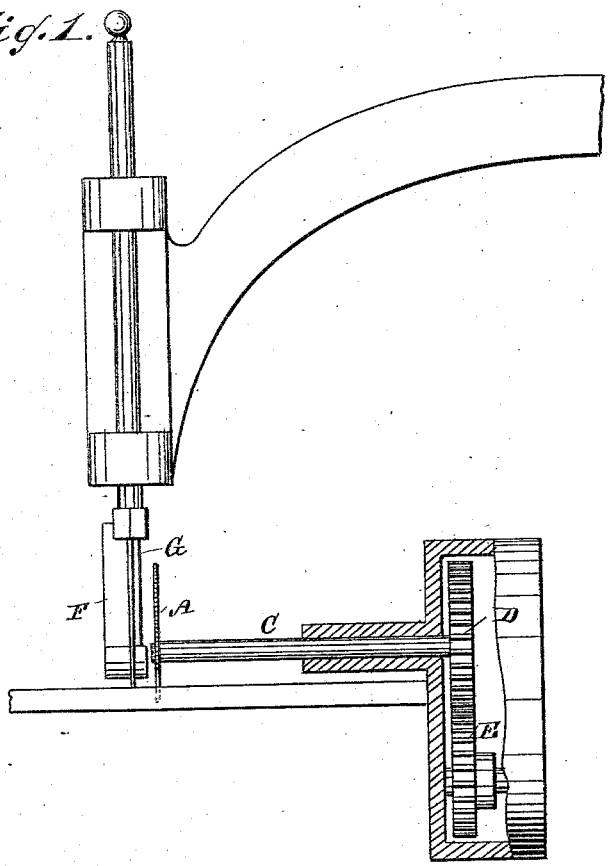
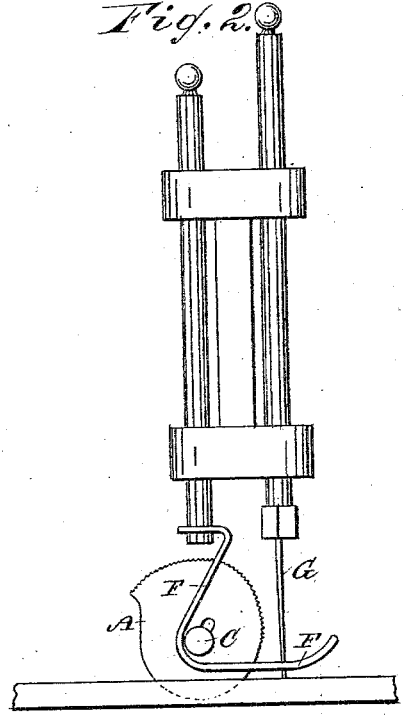
WITNESSES:
Theo. G. Hoster
B. G. Underwood.
INVENTOR:
D. Maus
BY Munn & Co
ATTORNEYS.

UNITED STATES PATENT OFFICE.

DANIEL MAUS, OF UTICA, NEW YORK.

TRIMMER FOR SEWING-MACHINES.

SPECIFICATION forming part of Letters Patent No. 296,423, dated April 8, 1884.

Application filed August 2, 1883. (No model.)

*To all whom it may concern:*

Be it known that I, DANIEL MAUS, of Utica, in the county of Oneida and State of New York, have invented a new and Improved Trimmer for Sewing-Machines, of which the following is a full, clear, and exact description.

The object of my invention is to provide a new and improved trimmer for the purpose of trimming off the seam of soft woolen or cotton goods while the same is being sewed on a sewing-machine.

Heretofore rotary trimming disks with smooth or straight edges have been cut away at one part of their periphery, so that they form practically an eccentric trimmer; but such eccentric trimmer, when in action, produces an intermittent back-thrust on the cloth in an opposite direction to its feed, which interferes with the uniformity of the feed, because the straight edge does not cut positively, but acts as a wedge, particularly when it is dull.

My invention consists in constructing a rotary trimmer with a periphery which is an eccentric curve, or a curve of constantly varying radius, and making saw-teeth serrations in this curved cutting-edge, whereby the trimmer is made to cut positively without producing the wedging action which antagonizes the feed, as hereinbefore mentioned.

Figure 1 is a longitudinal view of part of a sewing-machine provided with my improved trimmer, parts being shown in section. Fig. 2 is an end view of the same.

The trimmer A consists of a disk or plate having an eccentric curve at its periphery, which curve is that of a volute spiral, or a curve of constantly increased radius, and which curved edge is sharpened, and at its point of greatest projection from the center has its edge for some distance wrought into small teeth or serrations. This disk is mounted on one end of a shaft, C, having a cog-wheel, D, on its opposite end, the cog-wheel D engaging with a cog-wheel, E, driven from the driving-shaft. The trimmer-disk A is set adjoining the presser-foot F and the needle G, and makes one revolution for every stitch of the needle.

I do not claim, broadly, a rotary cutting-disk having a smooth or unbroken edge and a part of its periphery cut away; and I am also aware that it is not new in other branches of the arts to make serrations or teeth on circular rotary cutters; but I do not know that the eccentric edge of a rotary trimmer for a sewing-machine has ever been serrated, and this, by preventing the wedging action on the cloth and the back-thrust of the same against the feed, gives an entirely new result.

Having thus fully described my invention, I claim as new and desire to secure by Letters Patent—

A rotary trimming-disk having an eccentrically-curved and sharpened edge of constantly-varying radius, with teeth or serrations upon the portion of its periphery having the greatest projection from the center, combined with a sewing-machine, substantially as shown and described.

DANIEL MAUS.

Witnesses:
EGBERT BAGG, Jr.,
CHARLES H. METZ.